(12) United States Patent
Nakata et al.

(10) Patent No.: US 10,896,322 B2
(45) Date of Patent: Jan. 19, 2021

(54) INFORMATION PROCESSING DEVICE, INFORMATION PROCESSING SYSTEM, FACIAL IMAGE OUTPUT METHOD, AND PROGRAM

(71) Applicant: Sony Interactive Entertainment Inc., Tokyo (JP)

(72) Inventors: Daisuke Nakata, Kanagawa (JP); Jigen Zhou, San Mateo, CA (US)

(73) Assignees: Sony Interactive Entertainment Inc., Tokyo (JP); Sony Interactive Entertainment LLC, San Mateo, CA (US)

( * ) Notice: Subject to any disclaimer, the term of this patent is extended or adjusted under 35 U.S.C. 154(b) by 136 days.

(21) Appl. No.: 16/167,853

(22) Filed: Oct. 23, 2018

(65) Prior Publication Data

US 2019/0138796 A1    May 9, 2019

Related U.S. Application Data

(60) Provisional application No. 62/581,187, filed on Nov. 3, 2017.

(51) Int. Cl.
*G06K 9/00* (2006.01)
*G02B 27/01* (2006.01)
*G06K 9/62* (2006.01)

(52) U.S. Cl.
CPC ....... *G06K 9/00302* (2013.01); *G02B 27/017* (2013.01); *G06K 9/00281* (2013.01); *G06K 9/6211* (2013.01); *G02B 2027/0138* (2013.01)

(58) Field of Classification Search
CPC .......... G06K 9/00302; G06K 9/00281; G06K 9/6211; G02B 27/017; G02B 2027/0138
USPC ....................................................... 382/209
See application file for complete search history.

(56) References Cited

U.S. PATENT DOCUMENTS

2018/0107275 A1*   4/2018   Chen ................. G06T 13/40

FOREIGN PATENT DOCUMENTS

EP       2916558 A1    9/2015
WO    2014068806       9/2016

\* cited by examiner

*Primary Examiner* — Michael R Neff
(74) *Attorney, Agent, or Firm* — Matthew B. Dernier, Esq.

(57) ABSTRACT

There is provided an information processing device including an image acquiring portion configured to acquire a photographed image obtained by photographing a user wearing a head mounted display, an expression estimating portion configured to estimate an expression of the user from an image of a mouth of the user included in the photographed image, an facial image producing portion configured to produce a facial image responding to the estimated expression of the user, and an output portion configured to output an image including the facial image.

7 Claims, 10 Drawing Sheets

INFORMATION PROCESSING DEVICE, INFORMATION PROCESSING SYSTEM, FACIAL IMAGE OUTPUT METHOD, AND PROGRAM

CROSS REFERENCE TO RELATED APPLICATIONS

This application claims the benefit of U.S. Provisional Patent Application No. 62/581,187, filed Nov. 3, 2017, the entire disclosure of which is hereby incorporated by reference.

BACKGROUND

The present disclosure relates to a technique for estimating an expression of a face.

There is a popular service in which a user broadcast-delivers a game image while he/she is playing the game to a plurality of viewing users through a shared site. PCT Patent Publication No. WO2014/068806 discloses shared processing for broadcast-delivering a live deliver image including a game image during play to viewing users. A player can deliver a camera image as well obtained by photographing a situation in which the player himself/herself plays a game together with a game image.

SUMMARY

A Head Mounted Display (HMD) provides an image to the whole field of view of a user, and increases a sense of immersion in a video world. Since the sense of immersion in the video world is more increased by a head tracking function, in recent years, a game play using the HMD has been popular.

Since the HMD is mounted to a face so as to cover both eyes and a nose, even if a photographed image of a player is included in a live delivery image, the great part of an expression of the face of the player is hidden. In the case where the photographed image of the player is included in the live delivery image, it is one of pleasures for the viewing user to see the expression of the player. Therefore, it is preferable that the expression of the player can be expressed in any kind of way.

In the light of the foregoing, it is therefore desirable to provide a technique with which an expression of a player is estimated, and a facial image responding to the estimated expression is produced.

To solve the problem, according to an embodiment of the present disclosure, there is provided an information processing device including an image acquiring portion, an expression estimating portion, a facial image producing portion, and an output portion. In this case, the image acquiring portion serves to acquire a photographed image obtained by photographing a user wearing a head mounted display. The expression estimating portion serves to estimate an expression of the user from an image of a mouth of the user included in the photographed image. The facial image producing portion serves to produce a facial image responding to the estimated expression of the user. The output portion serves to output an image including the facial image.

According to another embodiment of the present disclosure, there is provided an information processing system including a terminal device and a server device. The information processing system includes an image acquiring portion, an expression estimating portion, a processing portion, and an output portion. In this case, the image acquiring portion serves to acquire a photographed image obtained by photographing a user wearing a head mounted display. The expression estimating portion serves to estimate an expression of the user from an image of a mouth of the user included in the photographed image. The processing portion serves to produce a facial image responding to the estimated expression of the user. The output portion serves to output an image including the facial image.

According to still another embodiment of the present disclosure, there is provided a facial image output method. The facial image output method includes: acquiring a photographed image obtained by photographing a user wearing a head mounted display, estimating an expression of the user from an image of a mouth of the user included in the photographed image, producing a facial image responding to the estimated expression of the user, and outputting an image including the facial image.

It should be noted that an arbitrary combination of the constituent elements described above, and the results obtained by converting an expression of the present disclosure among a method, a device, a system, a recording medium, a computer program, and the like are valid in terms of embodiments of the present disclosure.

As set forth hereinabove, according to the present disclosure, there is provided the technique with which the expression of the player is estimated, and the facial image responding to the estimated expression is produced.

DETAILED DESCRIPTION OF THE PREFERRED EMBODIMENT

Figure 1:
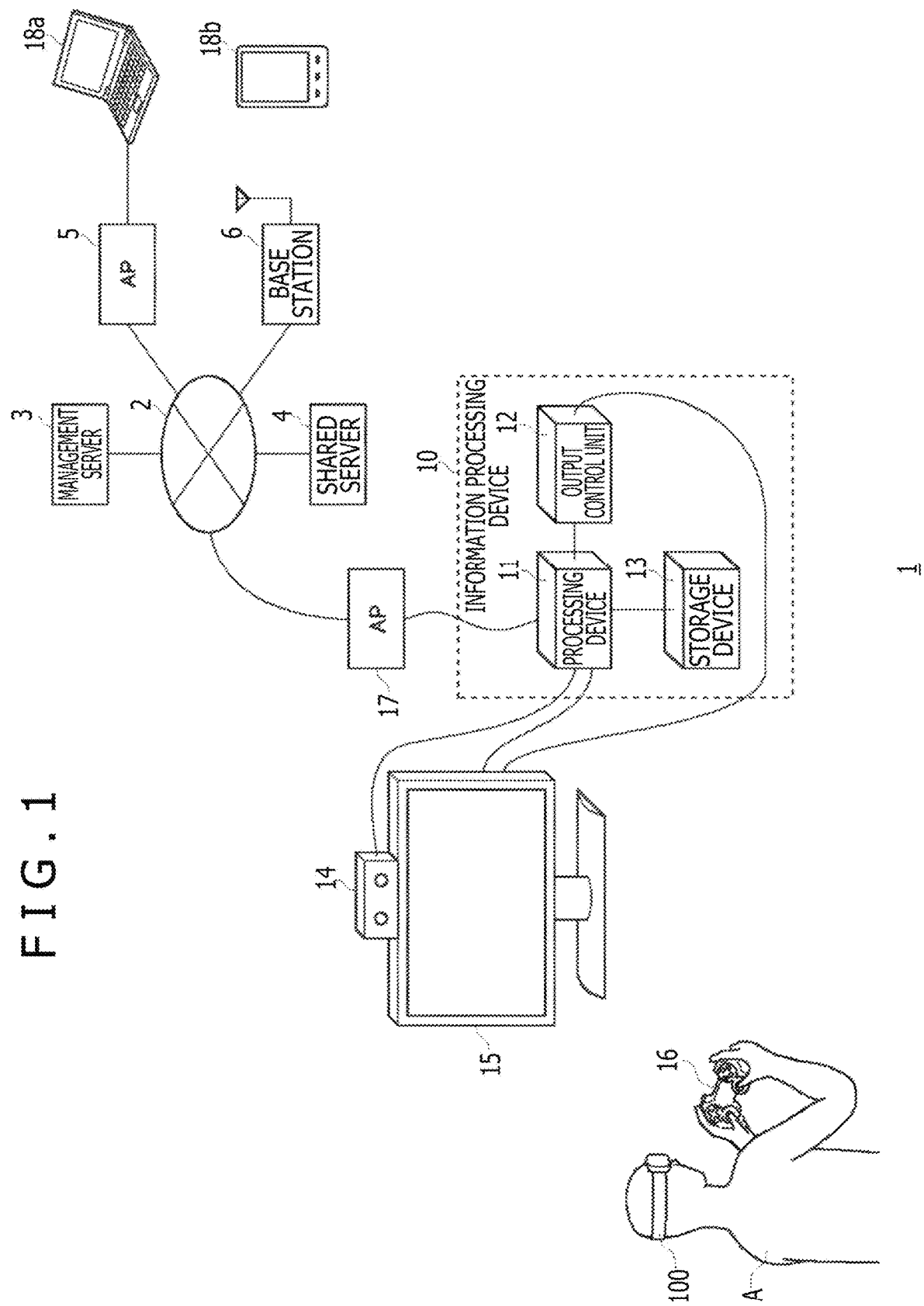
FIG. 1 is a view depicting an information processing system according to an embodiment of the present disclosure.

FIG. 1 depicts an information processing system 1 according to an embodiment of the present disclosure. The information processing system 1 live-delivers an image (avatar image) produced based on an image obtained by photographing a user A together with an image of a game which the user A as a deliver source is playing, thereby realizing an environment in which another viewing user views the live-delivered image. The information processing system 1 is provided with an information processing device 10 which a delivery user utilizes, a management server 3, a shared server 4, and various kinds of terminal devices 18a and 18b which a viewing user utilizes. The information processing device 10, the management server 3, the shared server 4, and the terminal devices 18a and 18b are connected to one another through the Internet, a Local Area Network (LAN), or a network 2 such as a telephone network. An access point (hereinafter referred to as "an AP") 17 has a function of a wireless access point and a router. The information processing device 10 is connected to the AP 17 via a wireless or a wired manner, and is communicably connected to the management server 3 and the shared server 4 on the network 2. The terminal device 18a is connected to the shared server 4 through an AP 5, and the terminal device 18b is connected to the shared server 4 through a base station 6.

The management server 3 provides a network service of a game to the user A of the information processing device 10. The management server 3 manages a network account for identifying a user. The user A signs in the network service which the management server 3 provides to the user A by using the network account. The user A signs in the network service from the information processing device 10, resulting in that saved data associated with the game, and virtual award goods (trophy) which the user gets during the game play can be registered in the management server 3 and the game image can be streaming-delivered to the shared server 4.

The information processing system 1 of the embodiment is further provided with an HMD 100, an input device 16, an image pickup device 14, and an output device 15. In this case, the user manipulates the input device 16 with his/her hand and finger. The image pickup device 14 serves to photograph the user who wears the HMD 100. The output device 15 serves to output an image and a sound. The output device 15 may be a television set. The HMD 100 is mounted to a head of the user and provides a video world of Virtual Reality (VR) to the user. The HMD 100 is given a head tracking function, and the display image is updated in conjunction with a motion of the head of the user, thereby increasing a sense of immersion in the video world.

The information processing device 10 is provided with a processing device 11, an output control unit 12 and a storage device 13. The processing device 11 is a terminal device for accepting manipulation information inputted to the input device 16 by the user, thereby carrying out an application such as a game. The processing device 11 and the input device 16 may be connected to each other through a cable, or may be connected to each other in accordance with a known wireless communication protocol. The output control unit 12 is a processing unit for outputting image data and sound data which are produced in the processing device 11 to the HMD 100. The output control unit 12 and the HMD 100 may be connected to each other through a cable, or may be connected to each other in accordance with a known wireless communication protocol.

The input device 16 is a device, such as a game controller, for supplying the manipulation information from the user to the processing device 11. The input device 16 has a plurality of input portions such as a plurality of push type manipulation buttons, an analog stick capable of inputting an analog amount, and a rotary button. The input device 16 in the embodiment includes a push type manipulation button, called "a SHARE button," for starting shared processing.

The image pickup device 14 is a stereoscopic camera, and photographs a user wearing the HMD 100 at a predetermined period, and supplies a photographed image to the processing device 11. The HMD 100 is provided with a marker (Light Emitting Diode (LED) for tracking) for tracking a head of the user, and the processing device 11 detects a motion of the HMD 100 based on a position of the marker included in the photographed image. It should be noted that the HMD 100 is equipped with a posture sensor (an acceleration sensor and a gyro sensor), and the processing device 11 acquires sensor data detected by the posture sensor from the HMD 100, thereby executing high-accuracy tracking processing in combination with utilization of the photographed image of the marker. It should be noted that with respect to the tracking processing, heretofore, the various techniques have been proposed and thus the processing device 11 may adopt any of the tracking techniques as long as it can detect the motion of the HMD 100.

Although since the user A views the image with the HMD 100, for the user wearing the HMD 100, the output device 15 is unnecessarily required, by preparing the output device 15, another user can view the displayed image from the output device 15. Although the output control unit 12 or the processing device 11 causes the output device 15 to display the same image as the image which the user wearing the HMD 100 views, the output control unit 12 may cause the output device 15 to display another image. For example, in such a case that the user wearing the HMD 100 and the another user play a game together, a game image from a viewpoint of an object (character) of another user concerned may be displayed from the output device 15.

The HMD 100 is a display device for displaying images on display panels located in front of eyes of a user who wears the HMD 100 on his/her head. The HMD 100 separately displays an image for the left eye, and an image for the right eye on the display panel for the left eye and the display panel for the right eye, respectively. These images compose a parallax image when viewed from the right and left points of view, and realize the stereopsis. It should be noted that since the user views the display panels through the respective optical lenses, the information processing device 10 supplies parallax image data in which optical distortion due to the lenses is corrected to the HMD 100. The processing for correcting the optical distortion may be executed by any of the processing device 11 and the output control unit 12.

The processing device 11, the storage device 13, the output device 15, the input device 16, and the image pickup device 14 may configure an existing type game system. In this case, the processing device 11 is a game device for carrying out a game, and the input device 16 is a device, such as a game controller, a keyboard, a mouse, or a joy stick, for supplying information associated with the manipulation by the user to the processing device 11. The storage device 13 stores therein system software, game software, or the like. The output control unit 12 and the HMD 100 are added to the constituent elements of this game system, thereby configuring the information processing system 1 for providing the VR image of the virtual three-dimensional space to the HMD 100.

It should be noted that the function by the output control unit 12 may be incorporated in the processing device 11. In a word, the processing unit of the information processing device 10 may be configured by one processing device 11, or may be configured by the processing device 11 and the output control unit 12.

The information processing device 10 can detect the position coordinates and posture of the HMD 100 from the sensor data detected by a posture sensor of the HMD 100, and can also detect the position coordinates and posture of the HMD 100 with high accuracy by analyzing the image of the marker (LED for tracking) of the HMD 100 photographed by the image pickup device 14. For example, in case of the game in which the user manipulates a play character within the game space, the information processing device 10 may also calculate the position within the virtual three-dimensional space of the play character based on the position information of the HMD 100, and may calculate the gaze direction of the play character based on the posture information associated with the HMD 100. It should be noted that since the user wearing the HMD 100 may not visually confirm the circumference situation, preferably is not moved basically, and the movement of the play character within the virtual three-dimensional space may be carried out based on the manipulation information associated with the input device 16.

The information processing device 10 according to the embodiment of the present disclosure streaming-delivers the image and sound of the game while the user is playing to the shared server 4, resulting in that the user can live-view the image and sound of the game from the terminal devices 18*a* and 18*b* which access the shared server 4. In such a manner, the image processing system 1 of the embodiment is operated as a system for delivering the data associated with the game image and sound.

Figure 2:
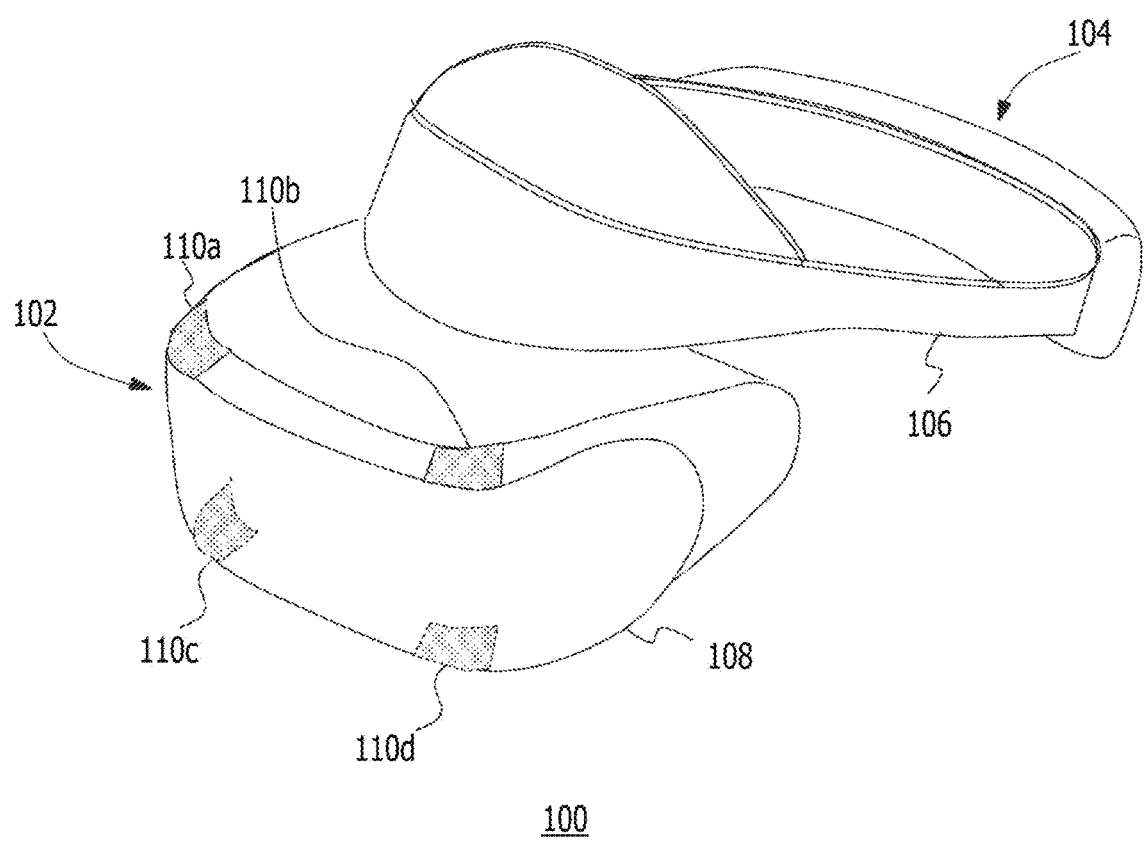
FIG. 2 is a view depicting an example of an appearance shape of an HMD.

FIG. 2 depicts an example of an appearance shape of the HMD 100. The HMD 100 is composed of an output mechanism portion 102 and a mounting mechanism portion 104. The mounting mechanism portion 104 includes a mounting band 106 which makes a circuit of the head of the user with the user wearing the mounting band 106 to fix the HMD 100 to the head. The mounting band 106 has a raw material or a structure which can be adjusted in length in respond to the circumference of the head of the user.

The output mechanism portion 102 includes a chassis 108 having such a shape as to cover the right and left eyes in a state in which the user wears the HMD 100, and is provided with display panels in an inside thereof in such a way that the display panels directly confront the eyes, at the time of the wearing. Each of the display panels may be a liquid crystal panel, an organic Electroluminescence (EL) panel, or the like. The chassis 108 is further provided with a pair of left and right optical lenses in the inside thereof which are located between the display panels and the eyes of the user, and by which a viewing angle of the user is expanded. In addition, the HMD 100 may be further provided with speakers or earphones in positions corresponding to the ears of the user, and an external headphone may be configured to be connected to the HMD 100.

An external surface of the chassis 108 is provided with luminescent markers 110*a*, 110*b*, 110*c*, and 110*d*. Although in this example, the LEDs for tracking compose the luminescent markers 110, other suitable kind of marker may also be available. In any case, all it takes is that such a kind of marker can be photographed by the image pickup device 14, and the information processing device 10 can analyze the image of the marker position. Although the number and arrangement of the luminescent markers 110 are not especially limited, the number and arrangement of the luminescent markers 110 with which the posture of the HMD 100 can be detected are required. Although in the illustrated example, the four luminescent markers 110 are provided in respective four corners in the front surface of the chassis 108, the luminescent markers 110 may also be further provided at a central portion of the chassis 108.

The HMD 100 may be connected to the information processing device 10 through the cable, or may be connected to the information processing device 10 in accordance with the known wireless communication protocol. The HMD 100 transmits the sensor data detected by the posture sensor to the information processing device 10. In addition, the HMD 100 receives the data associated with the game image and sound produced in the information processing device 10 and displays the data thus received on the display panel for the left eye, and the display panel for the right eye, and outputs the sound from the earphones.

Figure 3:
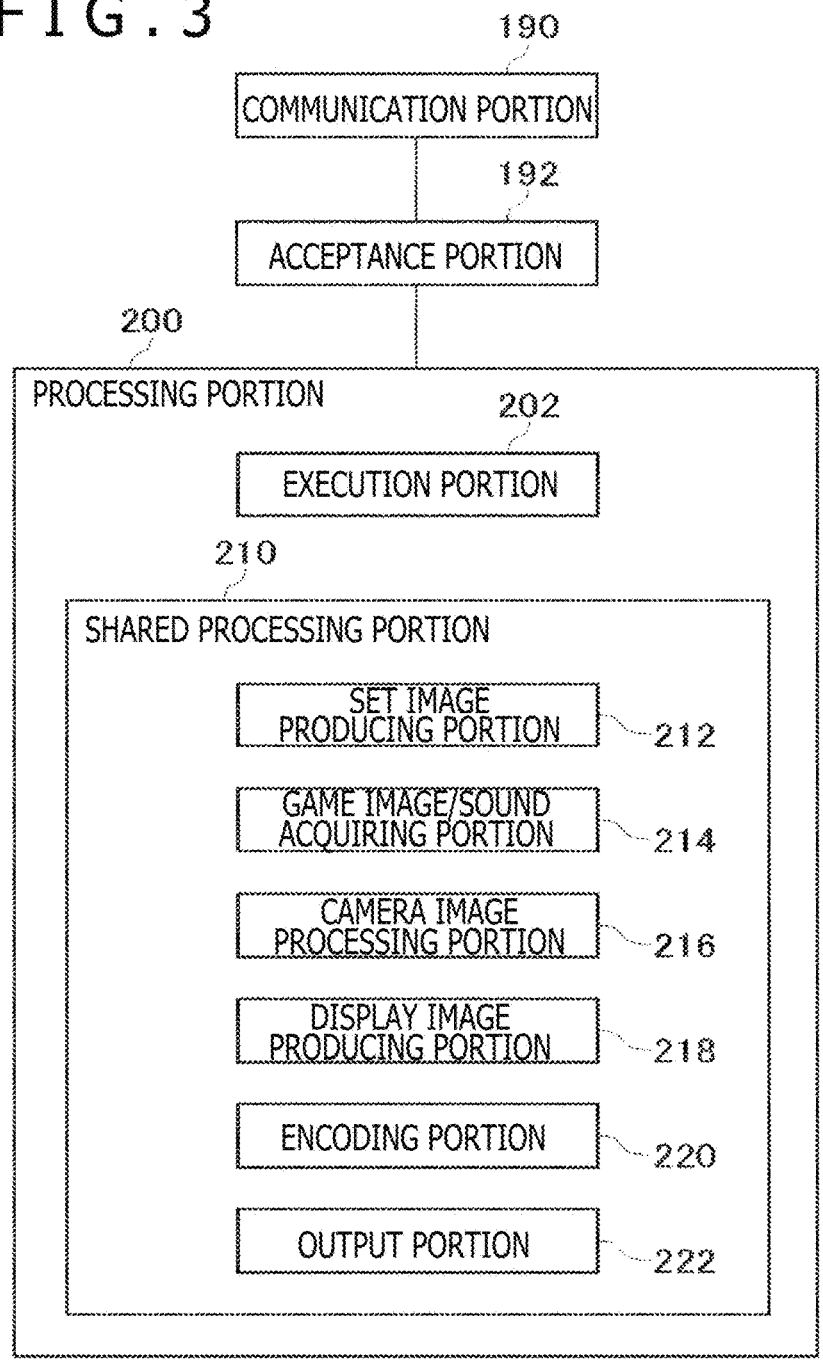
FIG. 3 is a diagram depicting a configuration of an information processing device according to the embodiment of the present disclosure.

FIG. 3 depicts a configuration of the information processing device 10 which operates as a device for delivering the streaming data. The information processing device 10 is provided with a communication portion 190, an acceptance portion 192, and a processing portion 200. The processing portion 200 has an execution portion 202 and a shared processing portion 210. The shared processing portion 210 has a set image producing portion 212, a game image/sound acquiring portion 214, a camera image processing portion 216, a display image producing portion 218, an encoding portion 220, and an output portion 222.

In FIG. 3, the constituent elements described as functional blocks for executing various pieces of processing can be configured by circuit blocks, a memory, and other Large-Scale Integrations (LSIs) in terms of the hardware, and can be realized by system software, a game program loaded into a memory, and the like in terms of the software. Therefore, it is understood by a person skilled in the art that these functional blocks are realized in various forms by only the hardware, by only the software, or a combination thereof, and thus the functional blocks are by no means limited to any of them.

The execution portion 202 executes game software (hereinafter, simply referred to as "a game" in some cases) to produce the image data and sound data associated with the game. As described above, the function exhibited in terms of the execution portion 202 is realized by the system software, the game software, the hardware such as the Graphics Processing Unit (GPU) and the like. It should be noted that in the embodiment, the game is an example of the applications, and thus the execution portion 202 may execute an application other than the game.

While the user A is playing the game, the execution portion 202 executes arithmetic operation processing for moving the game character in the virtual space based on the manipulation information inputted to the input device 16 by the user A. The execution portion 202 includes a GPU for executing rendering processing and the like. The execution portion 202 produces game image data from a position of a point of view within the virtual space (virtual camera) in response to a result of the arithmetic operation processing in the virtual space. In addition, the execution portion 202 produces game sound data in the position of a point of view within the virtual space.

Figure 4:
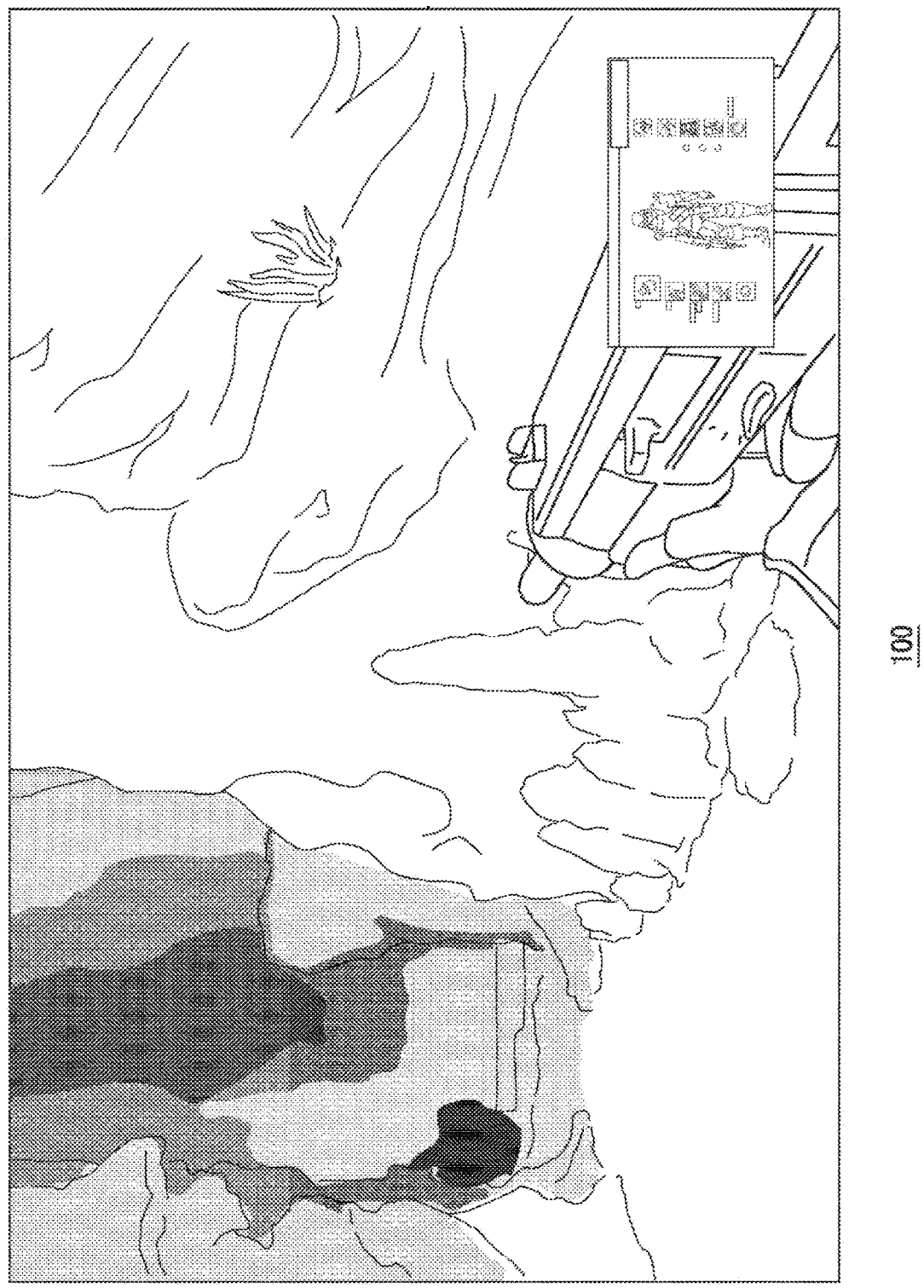
FIG. 4 is a view depicting an example of a game screen displayed on the HMD.

FIG. 4 depicts an example of the game screen displayed on the HMD 100. While the user A is playing the game, the execution portion 202 produces the game image data and the game sound data (referred to as "the game image/sound data" in combination thereof) which are outputted to the HMD 100. The communication portion 190 transmits the game image/sound data to the HMD 100, and the game image and sound is then outputted from the HMD 100.

The shared processing portion 210 in the embodiment executes processing for sharing the image/sound data during the playing of the game by the user A with another user. This shared processing is executed with the fact that the user A manipulates a specific input portion (SHARE button) provided in the input device 16 as a turning point.

When during the playing of the game, the acceptance portion 192 accepts information associated with a manipulation of the SHARE button from the input device 16 by the user A, the shared processing portion 210 starts the shared processing for streaming-delivering the game image/sound data to the shared server 4. At first, the shared processing portion 210 produces an input image indicating choices about the sharing of the game image/sound data.

Figure 5:
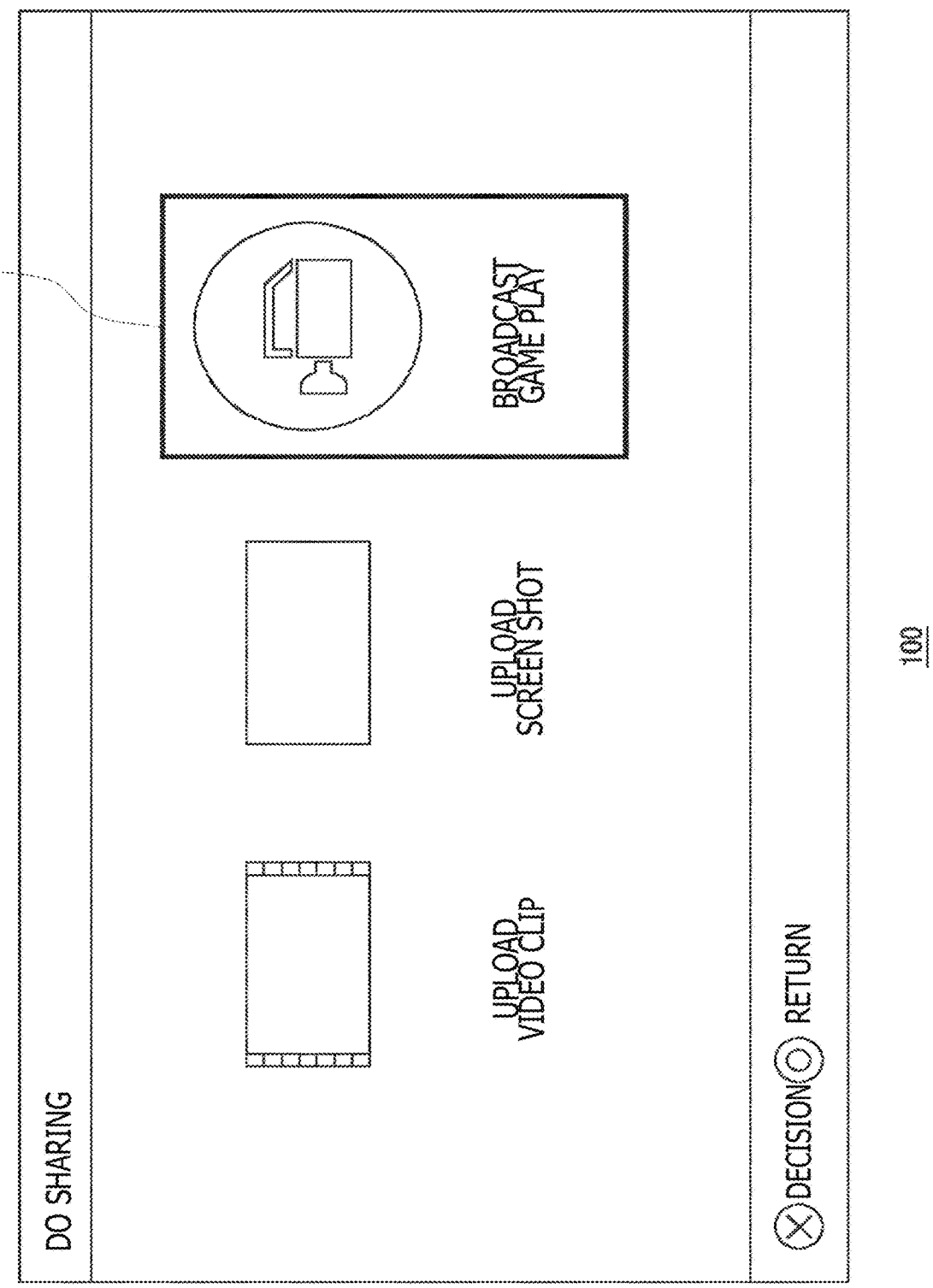
FIG. 5 is a view depicting an example of an input screen depicting choices of shared processing.

FIG. 5 depicts an example of an input screen exhibiting choices of the shared processing. The set image producing portion 212 produces an input image exhibiting the choices and displays the input image on the display panel of the HMD 100. On this input screen, the three choices about the sharing of the image/sound data are depicted. "Upload video clip" is a Graphical User Interface (GUI) for specifying that the image recorded in the storage device 13 is uploaded into the shared server 4. "Upload screen shot" is a GUI for specifying that an image of a screen shot is uploaded into the shared server 4. In addition, "broadcast game play" is a GUI for specifying that the image/sound data associated with the game is lived through the shared server 4. The user A manipulates the input device 16 to move a frame 180, and selects any of the GUIs to press a decision button, thereby executing the selected shared processing.

Figure 6:
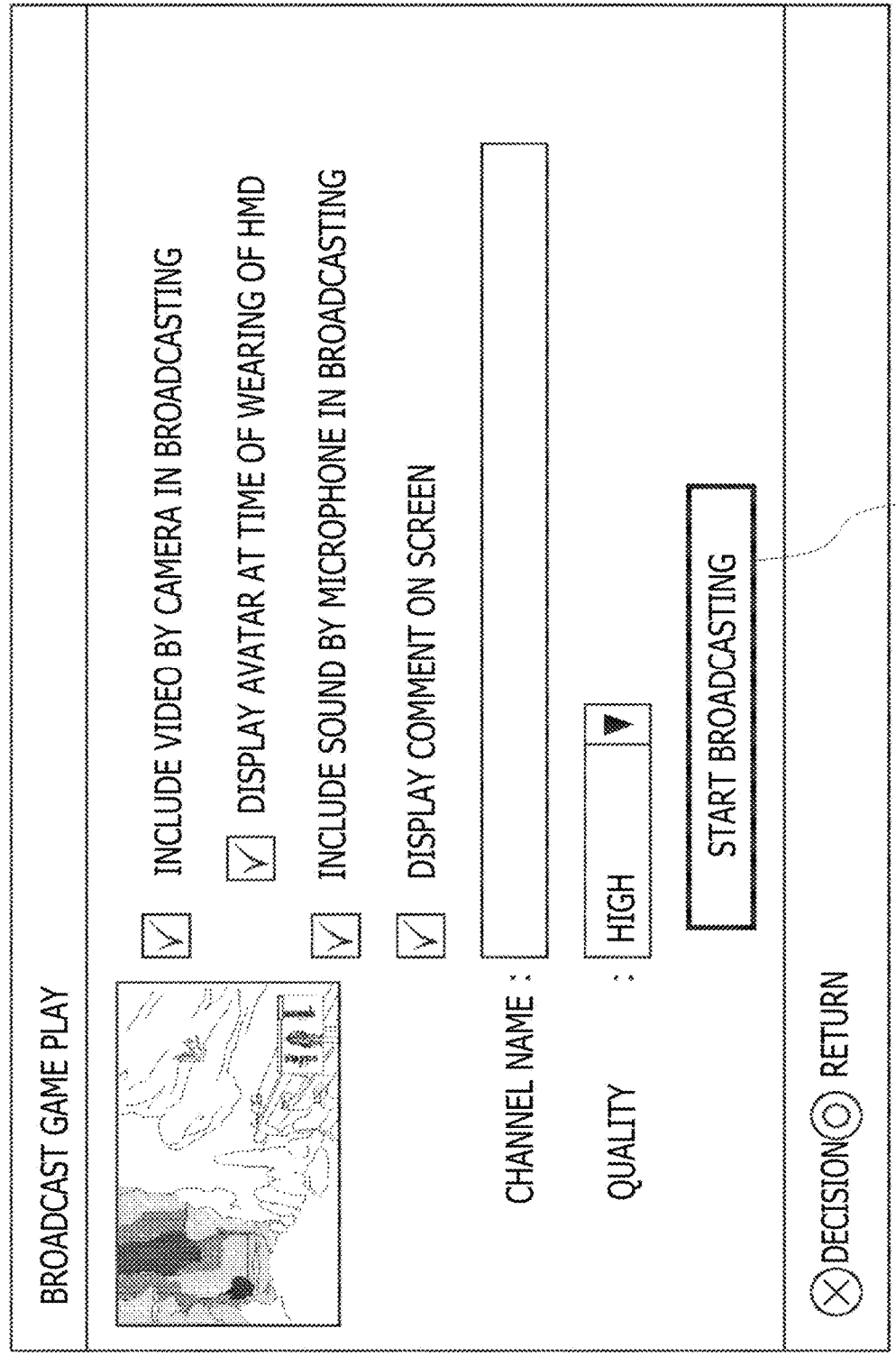
FIG. 6 is a view depicting an example of a set screen.

FIG. 6 depicts an example of a set screen which is displayed in the case where "broadcast game play" is selected. An item for setting a form of the broadcast is included in the set screen. In this embodiment, the user A agrees with "include video by camera in broadcasting." Therefore, the data associated with the video obtained by the photographing with the image pickup device 14 is delivered together with the image/sound data associated with the game. When a check box of "include video by camera in broadcasting" is selected, at the time of the mounting of the HMD 100 by the user A, a check box for setting that the avatar is displayed instead of displaying the face image of the user A is displayed.

When the user is wearing the HMD 100, the both eyes and the nose are covered by the chassis 108. Then, in the information processing device 10 of the embodiment, when the user A selects the check box of "display avatar at time of wearing of HMD," the camera image processing portion 216 estimates an expression of the user who wears the HMD 100 to produce the facial image of the avatar responding to the estimated expression, thereby including the video in which the camera image is synthesized in the live delivery image. Hereinafter, it is supposed that "display avatar at time of wearing of HMD" is selected. However, if "display avatar at time of wearing of HMD" is not selected, then, the photographed image of the user wearing the HMD 100 shall be included in the live delivery image. If the user disposes the frame 182 in "start broadcasting" and presses the decision button of the input device 16, then, the acceptance portion 192 informs the shared processing portion 210 of the start of the broadcasting.

When the broadcasting is started, the game image/sound acquiring portion 214 acquires the game image/sound data from the execution portion 202. In addition, the camera image processing portion 216 executes the processing for producing the avatar image based on the photographed image of the user wearing the HMD 100, and synthesizing the photographed image with the avatar image. It should be noted that when the broadcasting is started, the display image producing portion 218 produces the live delivery image with a screen layout complying with the information set in the set screen. It should be noted that the live delivery image is also supplied to the HMD 100, and therefore, the delivery user and the viewing user view the same live delivery image.

Figure 7:
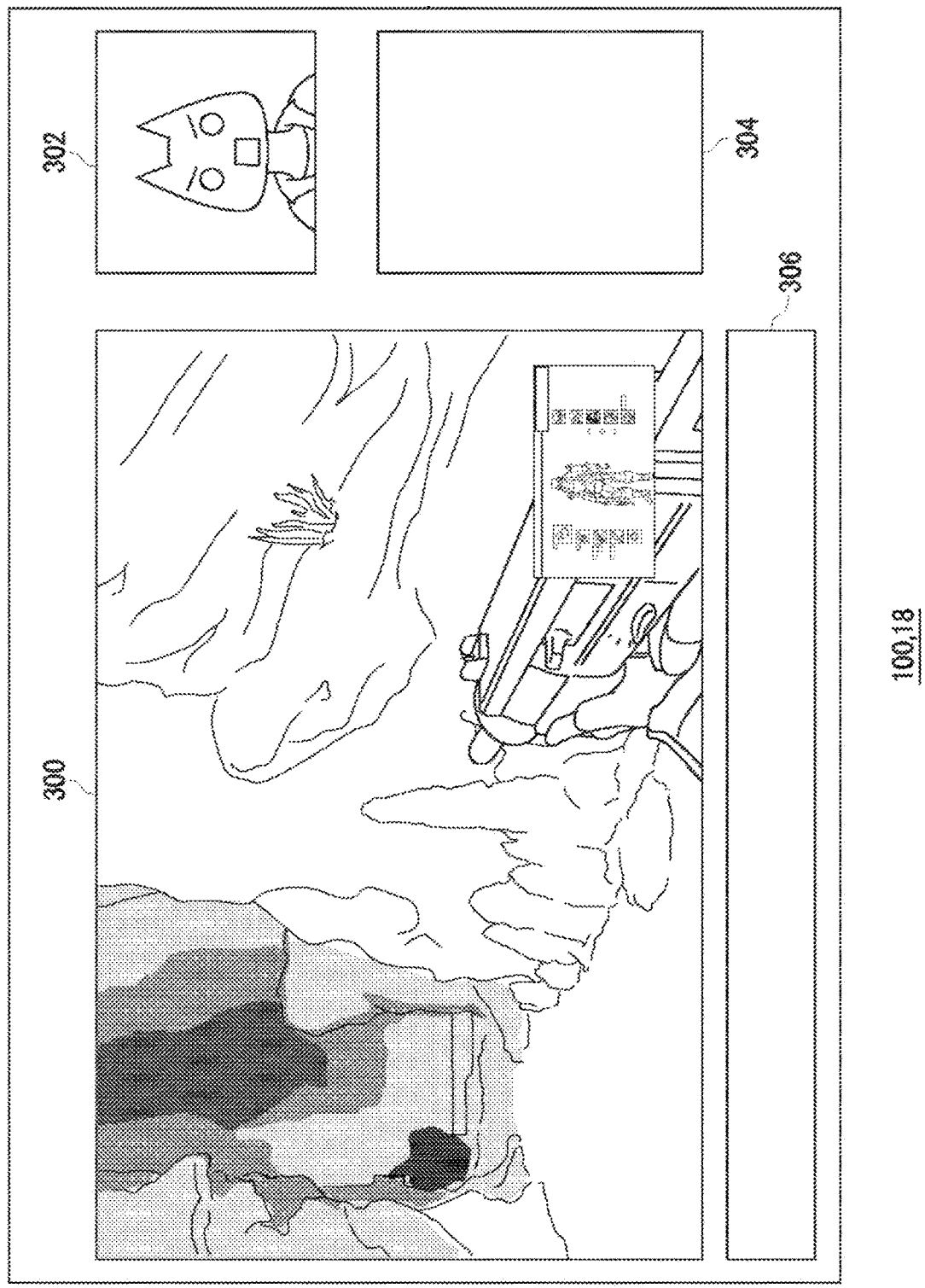
FIG. 7 is a view depicting an example of a live delivery image.

FIG. 7 depicts an example of the live delivery image. When the streaming delivery is started, the display image producing portion 218 produces the display image in accordance with a screen layout depicted in FIG. 7. In the example of the screen depicted in FIG. 7, a play image of a game is displayed in a play image display area 300. The image obtained by synthesizing the photographed image photographed by the image pickup device 14 with the facial image of the avatar is displayed in a camera image display area 302.

A comment from the viewing user is displayed in a comment display area 304. It should be noted that the viewing user can input a comment from the terminal device 18, and the comment thus inputted is transmitted to the information processing device 10 through the shared server 4. A message which the user A inputs for the viewing user is displayed in a message display area 306. As a result, the user A and the viewing user can make a communication with each other.

Hereinafter, a description will be given with respect to a configuration for producing the synthetic image which is to be displayed in the camera image display area 302.

Example 1

Figure 8:
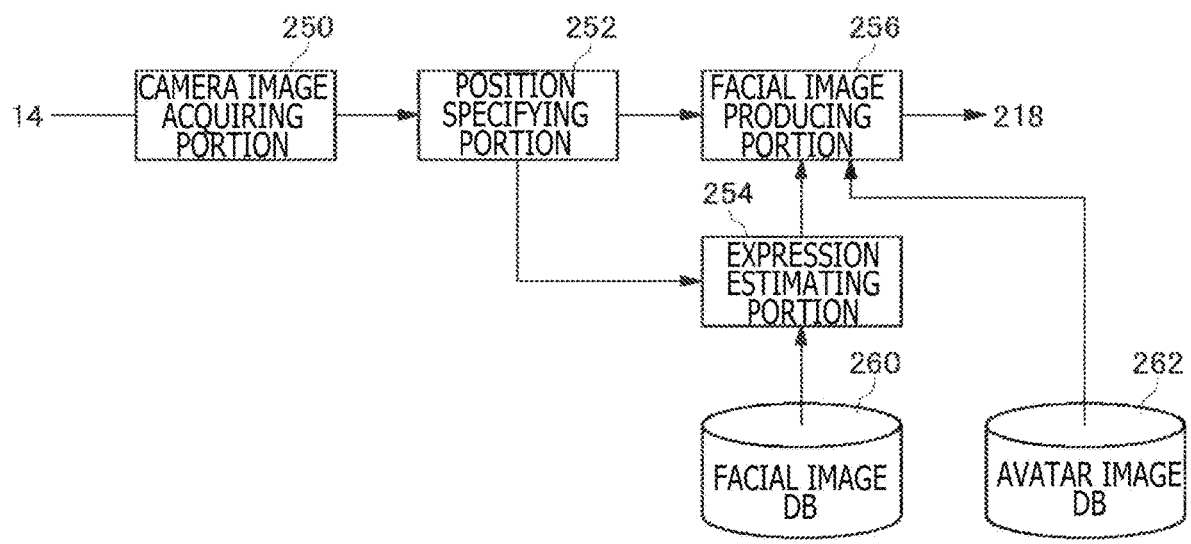
FIG. 8 is a diagram depicting a configuration of a camera image processing portion.

FIG. 8 depicts a configuration of the camera image processing portion 216. The camera image processing portion 216 has a camera image acquiring portion 250, a position specifying portion 252, an expression estimating portion 254, a facial image producing portion 256, a facial image database (DB) 260, and an avatar image DB 262. The facial image DB 260 stores therein a plurality of pieces of facial image data used to execute the matching processing with the photographed image of the user. The avatar image DB 262 stores therein the avatar image data with which the photographed image of the user is to be synthesized. The facial image DB 260 and the avatar image DB 262 may be configured in the storage device 13.

The camera image acquiring portion 250 acquires the photographed image obtained by photographing the user wearing the HMD 100 from the image pickup device 14.

Figure 9:
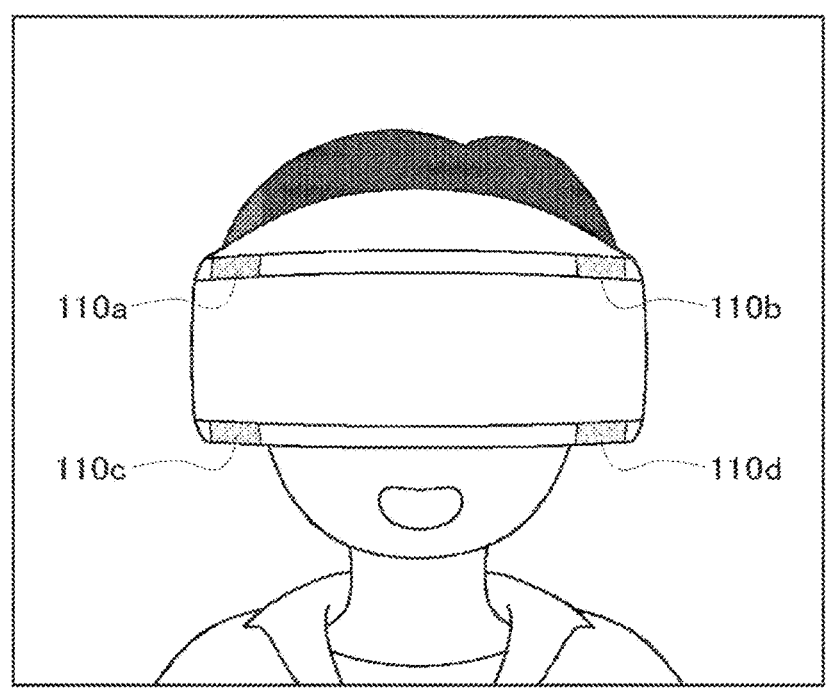
FIG. 9 is a view depicting an example of a photographed image.

FIG. 9 depicts an example of the photographed image. The luminescent markers 110a, 110b, 110c, and 110d which are provided so as to be used for the tracking are lighted in a front surface of the HMD 100. When the position specifying portion 252 detects the luminescent markers 110a, 110b, 110c, and 110d which emit the light in a predetermined luminescent color from the photographed image, the position specifying portion 252 determines that the user wears the HMD 100, and specifies the position of the HMD 100. When the position specifying portion 252 specifies the position of the HMD 100, the position specifying portion 252 estimates the position and size of the face from the specified position of the HMD 100, and specifies an image of a mouth of the user.

The chassis 108 of the HMD 100 of the example is configured so as to cover the eyes and nose of the user. Therefore, it is anticipated that the mouth of the user is photographed on the lower side of a lower end of the chassis 108. Then, the position specifying portion 252 is programmed in such a way that when the position specifying portion 252 specifies the position of the HMD 100, the position specifying portion 252 explores the image of the mouth on the lower side of the HMD 100.

The expression estimating portion 254 estimates the expression of the user from the image of the mouth of the user included in the photographed image. The facial image DB 260 stores therein feature points of various shapes of mouths (mouth shape data), and emotion data so as to be associated with each other. For example, the facial image DB 260 holds therein a result of machine learning of a correspondence relationship between the mouth shape data and the emotion data.

It should be noted that the emotion data may be data in which a plurality of kinds of emotion is expressed by emotion numbers. For example, the emotion numbers may be set in such a way that the emotion number 1 is joy, the emotion number 2 is anger, the emotion number 3 is sorrow, the emotion number 4 is pleasure, the emotion number 5 is sadness, the emotion number 6 is hatred, the emotion number 7 is surprise, and so forth. Since the emotion is reflected on the expression, the specification of the emotion numbers is equal to the estimation of the expression of the user.

The expression estimating portion 254 extracts the feature points of the shape of the mouth from the image of the mouth included in the photographed image, and executes processing for matching the feature points of the shape of the mouth with the mouth shape data recorded in the facial image DB 260. The expression estimating portion 254 calculates a matching score with the mouth shape data recorded in the facial image DB 260, and specifies the emotion number associated with the mouth shape data from which the highest score value is derived. It should be noted that for the matching processing, the various techniques such as the machine learning may be used.

The avatar image DB 262 stores therein the facial image of the avatar every emotion number. Although the facial image may be a still image, the facial image may be a moving image. The user can preferably freely select the avatar. The facial image producing portion 256 reads out the facial image of the avatar responding to the expression (emotion) of the user estimated by the expression estimating portion 254 from the avatar image DB 262, and produces the facial image of the user. Specifically, the facial image producing portion 256 produces a synthetic image in which the facial image of the avatar is superimposed on the photographed image in response to the position and size of the estimated face of the user based on the position and size of the face of the user estimated by the position specifying portion 252. The facial image producing portion 256 supplies the synthetic image to the display image producing portion 218. As a result, as depicted in FIG. 7, the display image producing portion 218 fits the synthetic image in the camera image display area 302, thereby producing the live delivery image. The encoding portion 220 encodes the live delivery image, and the output portion 222 outputs the live delivery image including the facial image of the avatar to the shared server 4.

In Example 1 described above, the facial image DB 260 stores therein the various mouth shape data and the emotion data so as to be associated with each other. The expression estimating portion 254 estimates the expression of the user from the shape of the mouth of the photographed user. In Examples 2 and 3 which will be described below, for the purpose of increasing an amount of information in the matching processing, the matching processing for not the mouth, but the entire face image is executed. In Examples 2 and 3 which will be described below, the facial image DB 260 stores therein at least the data (facial image data) associated with the feature points extracted from the entire face image, and the emotion data so as to be associated with each other.

Example 2

Figure 10:
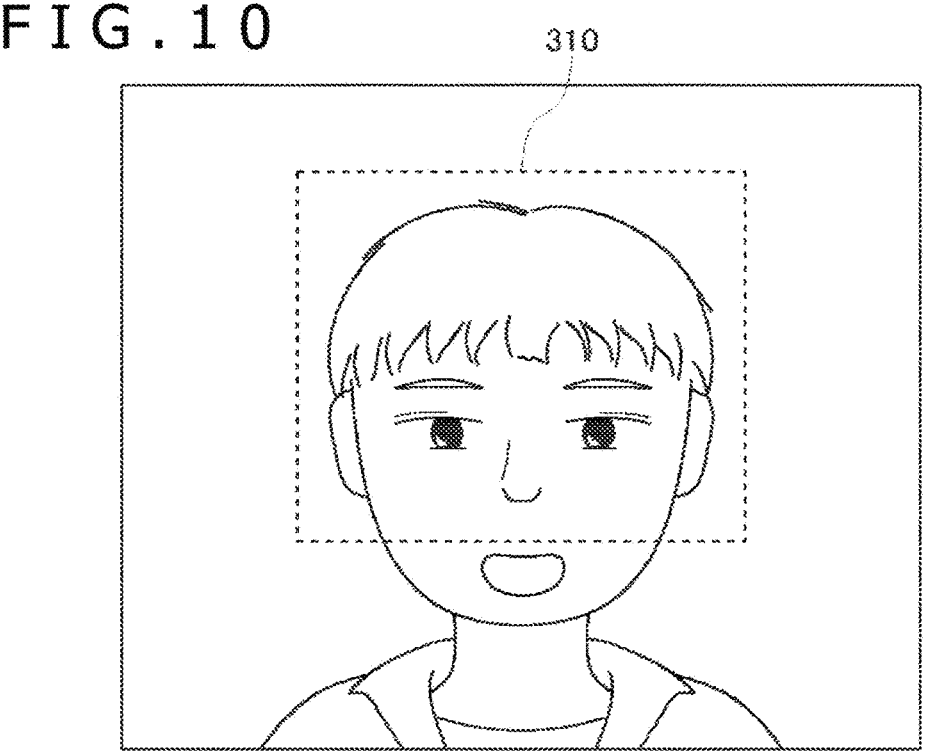
FIG. 10 is a view depicting an image obtained by synthesizing the photographed image with a facial image.

FIG. 10 depicts an image obtained by synthesizing the photographed image depicted in FIG. 9 with a facial image 310. The facial image 310 is a predetermined standard image, and is an image on the upper side with respect to the mouth of the face. Although the facial image 310 may be an image which is obtained by photographing the user A in advance, the facial image 310 may also be an image of another person which is prepared on the system side. It should be noted that the facial image 310 is preferably an expressionless image as much as possible.

The expression estimating portion 254 produces a synthetic image which is obtained by superimposing the facial image 300 on the photographed image in response to the position and size of the estimated face of the user based on the position and size of the face of the user estimated by the position specifying portion 252. In a word, the expression estimating portion 254 produces the synthetic image which is obtained by connecting the predetermined image on the upper side of the face including at least the eyes to the image on the lower side of the face including the mouth of the user. The expression estimating portion 254 extracts the feature points such as parts such as the eyes and mouth included in the face, and the shape of the face from the face image depicted in FIG. 10, and executes the processing for matching the data associated with the feature points with a plurality of pieces of facial image data included in the facial image DB 260, thereby estimating the expression of the user. According to Example 2, the matching processing utilizing the feature points of not only the shape of the mouth, but also the entire face is carried out, thereby enabling the matching accuracy to be increased. In particular, in the case where the facial image DB 260 previously holds therein the result of the machine learning for the image of the entire face, the image obtained by synthesizing the facial image 310 is used, thereby enabling the matching accuracy to be dramatically increased.

Example 3

Figure 11:
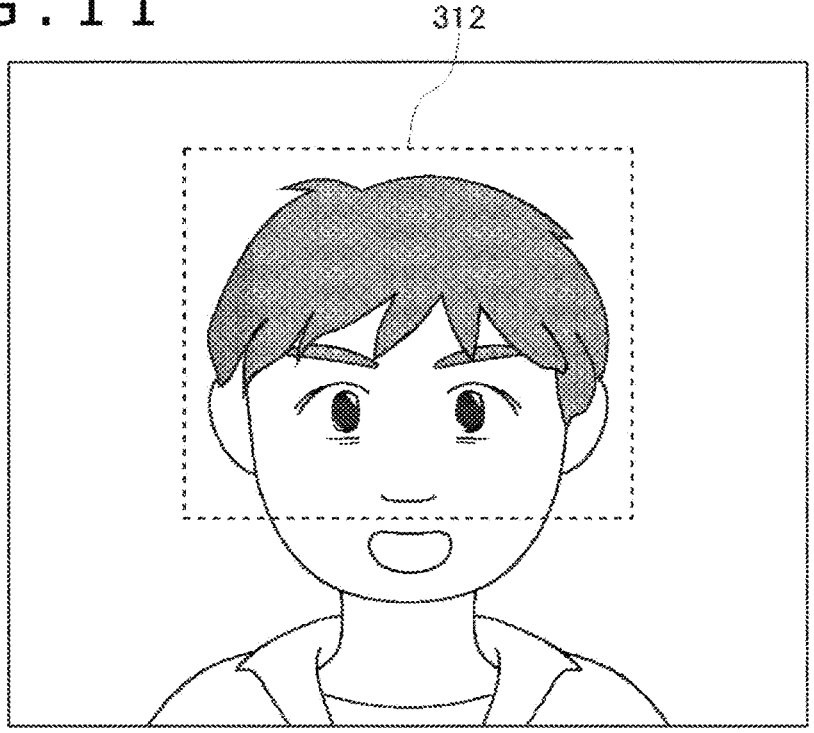
FIG. 11 is a view depicting an image obtained by synthesizing the photographed image with another facial image.

FIG. 11 depicts an image which is obtained by synthesizing the photographed image depicted in FIG. 9 with a facial image 312. The facial image 312 is a predetermined standard image expressing the emotion, and an image on the upper side with respect to the mouth of the face same as the case of the facial image 310. Although the facial image 312 may be an image obtained by photographing the face of the user A in advance in a state in which the individual emotions are expressed, the facial image 312 may also be an image of another person which is prepared every emotion on the system side.

The expression estimating portion 254 produces a synthetic image which is obtained by superimposing the facial image 312 on the photographed image in response to the position and size of the estimated face of the user based on the position and size of the face of the user estimated by the position specifying portion 252. In Example 3, the expression estimating portion 254 executes the expression estimating processing in two stages. In the first stage, as described in Example 1, the expression (emotion) of the user is estimated by using the feature points of the shape of the mouth. The expression estimating portion 254 reads out the facial image 312 which expresses the estimated emotion and which is stored in the facial image DB 260 based on the emotion number derived at this time. As a result, the expression estimating portion 254, as depicted in FIG. 11, produces the synthetic image which is obtained by connecting the facial image 312 on the upper side of the face including at least the eyes to the image on the lower side of the face including the mouth of the user. For example, although the facial image 312 depicted in FIG. 11 is a standard image expressing the surprise, the facial image DB 260 stores therein standard images as well expressing other emotions, and the expression estimating portion 254 combines the standard image responding to the emotion estimated in the first stage with the image on the lower side including the mouth of the user.

Next, as the second stage, the expression estimating portion 254 extracts the feature points such as parts such as the eyes and mouth included in the face, and the shape of the face from the face image depicted in FIG. 11, and executes the processing for matching the data associated with the feature points with a plurality of pieces of facial image data included in the facial image DB 260, thereby estimating the expression of the user. According to Example 3, the expression estimating portion 254 carries out the expression estimation in the two stages, thereby enhancing the matching accuracy. In particular, in the case where the facial image DB 260 previously holds therein the result of the machine learning for the image of the entire face, the image obtained by synthesizing the facial image 312 is used, thereby enabling the matching accuracy to be dramatically increased.

As set forth hereinabove, the present disclosure has been described based on the embodiments. However, it is understood by a person skilled in the art that the embodiment is merely an exemplification, and various modified changes can be made in combinations of the constituent elements or processing processes thereof, and such modified changes fall also within the scope of the present disclosure.

Although Examples 1 to 3 have described that the information processing device 10 estimates the expression of the user, and produces the facial image responding to the estimated expression of the user, this display image producing processing may be executed in the shared server 4. In this case, the shared server 4 may function as the information processing device, and the facial image of the user may be produced based on the photographed image acquired from the information processing device 10. It should be noted that the information processing system 1 may be provided with the shared server 4 or another server device, and the information processing device 10 and the server device may take partial charge of the work of the display image producing processing. For example, the server device may execute the matching processing, and may return the matching result back to the information processing device 10.

In addition, although Examples 2 and 3 have described that the expression estimating portion 254 synthesizes the facial image 310 or 312 which is obtained by photographing the upper side of the face of another person, the facial images 310 and 312 may be selected from the facial image DB 260 with the race, the sex or the like of the user A as the standard.

What is claimed is:

1. An information processing device, comprising:
   an image acquiring portion configured to acquire a photographed image obtained by photographing a user wearing a head mounted display;
   an expression estimating portion configured to estimate an expression of the user;
   an facial image producing portion configured to produce a synthetic image of a face of the user by combining: (i) a facial image of an upper side of a face, and (ii) an image of a lower side of a face of the user, including the mouth of the user, from the photographed image; and
   an output portion configured to output the synthetic image,
   wherein the expression estimating portion is configured to execute processing for matching the synthetic image with a plurality of facial image data in order to improve the estimated expression of the user.

2. The information processing device according to claim 1, further comprising:
   a position specifying portion configured to specify the image of the mouth of the user from the photographed image,
   wherein the position specifying portion specifies a position of the head mounted display, and specifies the image of the mouth of the user from the specified position of the head mounted display.

3. The information processing device according to claim 1, wherein the facial image producing portion produces the synthetic image by combining: (i) a predetermined image of the upper side of the face including at least an eye, and (ii) the image of the lower side of the face of the user.

4. The information processing device according to claim 1, wherein the facial image producing portion produces the synthetic image by combining: (i) an image of the upper side of the face responding to the expression estimated from the image of the mouth of the user, and (ii) the image of the lower side of the face of the user.

5. An information processing system including a terminal device and a server device, comprising:
   an image acquiring portion configured to acquire a photographed image obtained by photographing a user wearing a head mounted display;
   an expression estimating portion configured to estimate an expression of the user;
   a processing portion configured to produce a synthetic image of a face of the user by combining: (i) a facial image of an upper side of a face, and (ii) an image of a lower side of a face of the user, including the mouth of the user, from the photographed image; and
   an output portion configured to output the synthetic image,
   wherein the expression estimating portion is configured to execute processing for matching the synthetic image with a plurality of facial image data in order to improve the estimated expression of the user.

6. A facial image output method, comprising:
   acquiring a photographed image obtained by photographing a user wearing a head mounted display;
   estimating an expression of the user;
   producing a synthetic image of a face of the user by combining: (i) a facial image of an upper side of a face, and (ii) an image of a lower side of a face of the user, including the mouth of the user, from the photographed image; and
   outputting the synthetic image,
   wherein the method further includes executing processing for matching the synthetic image with a plurality of facial image data in order to improve the estimated expression of the user.

7. A non-transitory, computer readable storage medium containing a program, which when executed by a computer, causes the computer to carry out actions, comprising:
    acquiring a photographed image obtained by photographing a user wearing a head mounted display;
    estimating an expression of the user;
    producing a synthetic image of a face of the user by combining: (i) a facial image of an upper side of a face, and (ii) an image of a lower side of a face of the user, including the mouth of the user, from the photographed image; and
    outputting the synthetic image,
    wherein the method further includes executing processing for matching the synthetic image with a plurality of facial image data in order to improve the estimated expression of the user.

\* \* \* \* \*

UNITED STATES PATENT AND TRADEMARK OFFICE
CERTIFICATE OF CORRECTION

PATENT NO. : 10,896,322 B2  
APPLICATION NO. : 16/167853  
DATED : January 19, 2021  
INVENTOR(S) : Daisuke Nakata and Jigen Zhou Page 1 of 1

It is certified that error appears in the above-identified patent and that said Letters Patent is hereby corrected as shown below:

On the Title Page

In (73) Assignees:
Delete: "; Sony Interactive Entertainment LLC, San Mateo, CA (US)"

Signed and Sealed this  
Thirty-first Day of August, 2021

Drew Hirshfeld  
*Performing the Functions and Duties of the*  
*Under Secretary of Commerce for Intellectual Property and*  
*Director of the United States Patent and Trademark Office*